United States Patent
Kobayashi et al.

(10) Patent No.: US 7,643,731 B2
(45) Date of Patent: Jan. 5, 2010

(54) LOW POWER DVD PLAYBACK IN A PORTABLE COMPUTING SYSTEM

(76) Inventors: Osamu Kobayashi, 1464 Fallen Leaf La., Los Altos, CA (US) 94024-5809; Anders Frisk, 2391 Sharon Rd., Menlo Park, CA (US) 94025

( * ) Notice: Subject to any disclaimer, the term of this patent is extended or adjusted under 35 U.S.C. 154(b) by 1068 days.

(21) Appl. No.: 10/903,656

(22) Filed: Jul. 29, 2004

(65) Prior Publication Data

US 2005/0163493 A1  Jul. 28, 2005

Related U.S. Application Data (60) Provisional application No. 60/538,985, filed on Jan. 23, 2004.

(51) Int. Cl.
| | |
|---|---|
| H04N 5/00 | (2006.01) |
| H04N 7/173 | (2006.01) |
| G06F 1/00 | (2006.01) |
| G06F 3/00 | (2006.01) |
| G06F 13/00 | (2006.01) |
| G06F 13/14 | (2006.01) |
| G06F 13/38 | (2006.01) |
| G09G 3/36 | (2006.01) |

(52) U.S. Cl. ............... 386/125; 386/126; 345/87; 345/520; 710/8; 710/10; 710/14; 710/16; 710/31; 710/38; 710/63; 713/323; 713/324; 725/92; 725/115

(58) Field of Classification Search ............... 386/125, 386/126, E5.042, E5.064; 345/87, 520; 348/E5.001, 348/E5.002, E5.007, E5.008, E7.071; 710/8, 710/10, 14, 16, 31, 38, 63; 725/92, 115; 713/323, 324; G9B/19.001, 27.019

See application file for complete search history.

(56) References Cited

U.S. PATENT DOCUMENTS 5,630,174 A * 5/1997 Stone et al. ............... 710/63

(Continued)

FOREIGN PATENT DOCUMENTS

CN  1570810  1/2005

(Continued)

OTHER PUBLICATIONS

Examination Report dated Nov. 23, 2007 from European Application No. 05250314.1.

(Continued)

*Primary Examiner*—Thai Tran
*Assistant Examiner*—Syed Y Hasan
(74) *Attorney, Agent, or Firm*—Christensen O'Connor Johnson Kindness PLLC (57) ABSTRACT

In a DVD playback mode only, the first type interface is disabled and a DVD driver unit having a hardware DVD decoder connected to a DVD reader unit arranged to read video data from a DVD inserted therein is powered on. In the described embodiment, the DVD decoder unit is also connected to the display screen by way of a second type interface is powered on. The video data is read from the DVD by the DVD reader unit and sent by the DVD reader unit to the hardware DVD decoder unit which then decodes the video data before passing it directly to a timing controller unit coupled to the display screen by way of the second type interface. The timing controller unit converts the video data at a native resolution to a display screen resolution that is then displayed on the display screen.

14 Claims, 4 Drawing Sheets

U.S. PATENT DOCUMENTS

| | | | |
|---|---|---|---|
| 5,692,211 | A | 11/1997 | Gulick et al. |
| 6,088,809 | A * | 7/2000 | Atkinson ................ 713/324 |
| 6,502,159 | B1 | 12/2002 | Chuang et al. |
| 6,522,832 | B1 * | 2/2003 | Fujikawa ................ 386/125 |
| 2002/0024481 | A1 * | 2/2002 | Kawabe et al. ............ 345/87 |
| 2003/0121055 | A1 * | 6/2003 | Kaminski et al. .......... 725/115 |

FOREIGN PATENT DOCUMENTS

| | | | |
|---|---|---|---|
| JP | 2003101918 | | 4/2003 |
| JP | 2003101918 | A * | 4/2003 |

OTHER PUBLICATIONS

Australian Examination Report dated Mar. 1, 2007 issued in corresponding Singapore Application No. SG 200500301-7.

International Search Report dated May 9, 2005 from corresponding European Patent Application No. 05250314.1.

Office Action in corresponding Chinese Application No. 200510054175.1 dated Aug. 6, 2007.

* cited by examiner

LOW POWER DVD PLAYBACK IN A PORTABLE COMPUTING SYSTEM

CROSS REFERENCE TO RELATED APPLICATIONS

This patent application takes priority under 35 U.S.C. 119 (e) to U.S. Provisional Patent Application No. 60/538,985 filed on Jan. 23, 2004 entitled "ENABLING INSTANT & LOWER-POWER DVD PLAYBACK ON A NOTEBOOK PC WITH SMART TCON by Kobayashi and Frisk which is incorporated by reference in its entirety.

BACKGROUND

Field of the Invention

The invention relates to portable computer systems. More specifically, a low power DVD playback system suitable for portable computers is disclosed.

OVERVIEW

Figure 1:
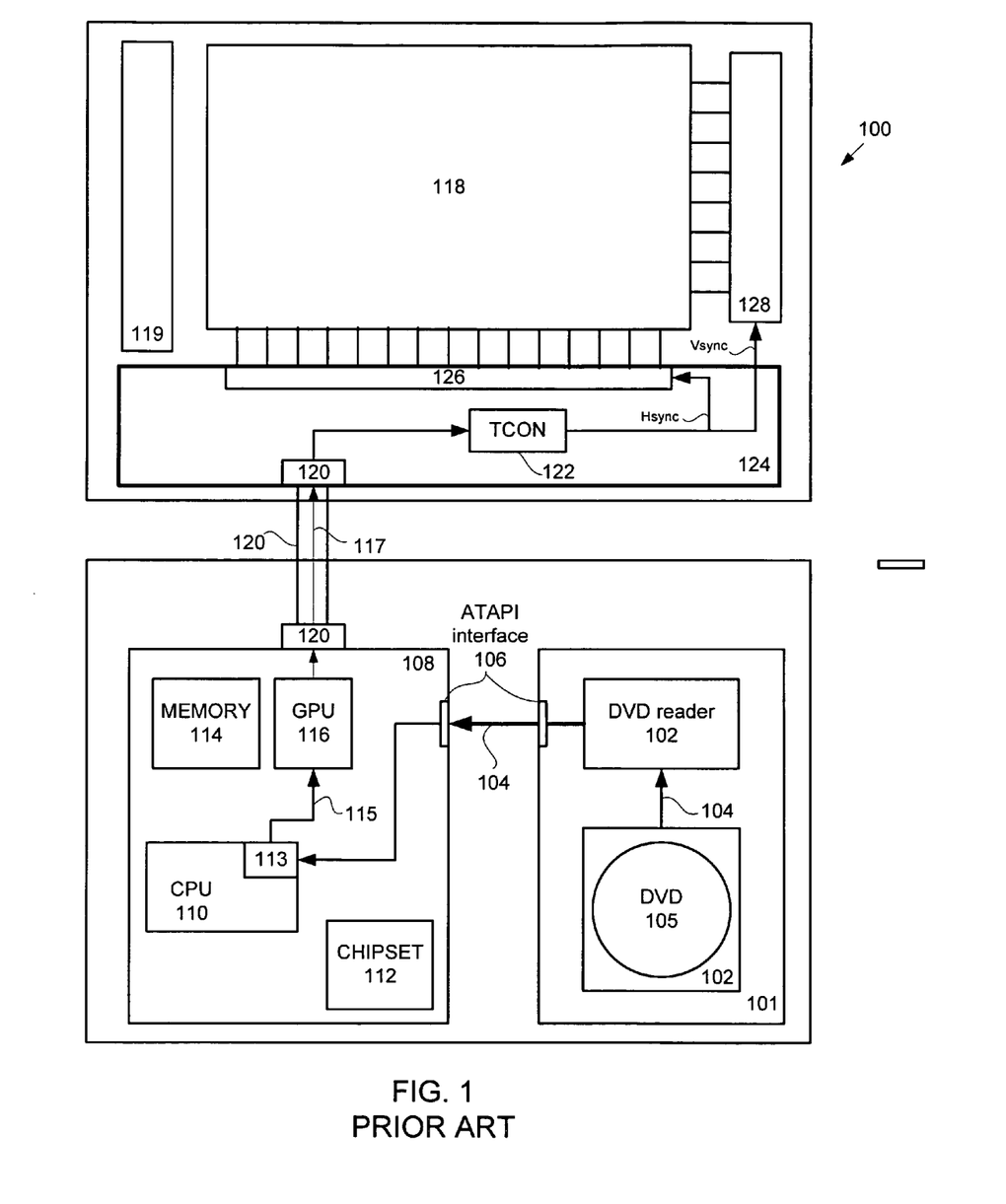
FIG. 1 illustrates a conventionally configured portable computer having a DVD drive that reads an MPEG data stream from a DVD inserted therein

In the last few years, Digital Versatile Disk (DVD) player has become a common feature of portable computers. FIG. 1 illustrates a conventionally configured portable computer 100 having a DVD playback unit 101 that includes DVD drive 102 that reads an MPEG data stream 104 from a DVD 105. The MPEG data stream 104 is then sent by way of an ATAPI interface 106 to a computer computational core 108 that includes a central processing unit (CPU) 110, a core logic chip-set 112 that acts to provide, in part, a number of switching functions, a system memory 114, and a graphics engine 116 (sometimes referred to as a graphical processing unit, or GPU). In order to display the video data stream on a display screen 118 (which in the case of portable computers is typically an LCD having a number of backlight inverters 119) provided by the MPEG data stream 104, the CPU 110 uses a software implemented MPEG decoder 113 to decode the MPEG data stream 104 into a video data stream 115 at a native format which must then be converted from the standard definition interlaced (SDi) format (i.e., 480i/576i) to that consistent with the display resolution (1024×786, 1280×1024, etc.). This conversion of the native video data stream 115 to a display format video stream 117 is typically performed by the GPU 116. Once converted, the display format video stream 117 is sent by way of an LVDS compliant data bus 120 to a timing controller 122 (TCON) included in or connected to a column driver controller circuit 124. The TCON 122 provides the necessary timing and control signals to both a number of column driver circuits 126 and row driver circuits 128 for proper display of the display format video stream 117 on the display 118.

Unfortunately, however, the conventional DVD playback described above requires substantial amounts of power (on the order of at least 34 W) in order to drive the computation core of the portable computer thereby substantially reducing battery lifetime. In addition to the reduction in battery life, the necessity to boot up the operating system (i.e., Windows™ in the case of a PC), requires a substantial amount of time.

Therefore, what is required is an apparatus, system, and method that reduces the power consumption required in DVD playback mode (and thereby increasing battery life) and reduces the amount of time it takes to enable the DVD playback mode.

SUMMARY OF THE INVENTION

What is disclosed is an apparatus, system, and method that reduces the power consumption required in DVD playback mode (and thereby increasing battery life) and reduces the amount of time it takes to enable the DVD playback mode.

In one embodiment, a low power method of displaying video from a video storage device in a portable computer system is disclosed. The method is carried out by providing a computer core with a central processing unit connected to a display portion of the portable computer system by way of a first type interface and an operably independent video playback unit arranged to read video data stored in a video storage device connected to the display portion by way of a second type interface. In a video playback mode only, powering on the video playback unit and if the computer core is powered on, powering off the computer core. Reading the video data at a native format from the video storage device, sending the video data to the display portion by way of the second type interface, converting the video data from the native format to a display format, and displaying the video data.

In another embodiment, computer program product suitable for execution in a portable computer system for low power displaying video from a video storage device is disclosed. The computer program product includes computer code for providing a computer core with a central processing unit connected to a display portion of the portable computer system by way of a first type interface and an operably independent video playback unit arranged to read video data stored in a video storage device connected to the display portion by way of a second type interface, computer code for powering up the video playback unit in a video playback mode only, computer code for powering down the computer core if the computer core is powered up, computer code for reading the video data at a native format from the video storage device, computer code for sending the video data to the display portion by way of the second type interface, computer code for converting the video data from the native format to a display format, computer code for displaying the video data, and computer readable medium for storing the computer code.

In yet another embodiment implemented in a portable computer having a computer core that includes a central processing unit connected to a display screen by way of a first type interface, a low power method of providing video from a DVD is disclosed. The portable computer is first powered up. In a DVD playback mode only, the first type interface is disabled and a DVD driver unit having a hardware DVD decoder connected to a DVD reader unit arranged to read video data from a DVD inserted therein is powered on. In the described embodiment, the DVD decoder unit is also connected to the display screen by way of a second type interface is powered up. The video data is read from the DVD by the DVD reader unit and sent by the DVD reader unit to the hardware DVD decoder unit which then decodes the video data before passing it directly to a timing controller unit coupled to the display screen by way of the second type interface. The timing controller unit converts the video data at a native resolution to a display screen resolution that is then displayed on the display screen.

In still another embodiment, a low power, instant on playback system suitable for inclusion in a portable, battery powered playback unit for playing encoded multimedia files is disclosed. The system includes a processor and an independently operable hardware multimedia decoder separate from the processor for decoding of the encoded multimedia files to form a decoded multimedia data stream wherein during playback of the multimedia files, the processor is powered down and the decoded multimedia data stream is sent directly to a timing controller unit incorporated into a display portion of the unit.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

In the last few years, the Digital Versatile Disk (DVD) player has become a common feature of portable computers. In order to play back the video data encoded on a DVD, conventionally configured portable computers (typically laptop computers, notebook computers, and the like) rely upon the central-processing unit (CPU) utilizing a software based MPEG decoder to provide the requisite MPEG decoding. In this way, the computer core must be both powered up and the operating system (Windows™ in the case of most PCs) booted up in order for the DVD to be played and the video encoded therein to be viewed by the user.

Unfortunately, however, the conventional DVD playback described above requires substantial amounts of power (on the order of at least 34 W) in order to drive the computer core of the portable computer thereby greatly reducing battery lifetime. Additionally, the time required to boot up the operating system can be substantial.

Therefore, the invention provides a system, method, and apparatus that provides a low power, instant on playback feature for any portable computer so configured. In particular, a hardware MPEG decoder separate from the computer core obviates the need for the CPU to provide software decoding of the MPEG data stream. In this way, the computer core is powered down and the decoded MPEG data stream is sent directly to a timing controller unit incorporated into a display portion of the computer which both converts the decoded video data from a native format to a display appropriate format and provides the necessary timing and control signals for display of the converted video data.

In one embodiment, a low power method of displaying video from a video storage device in a portable computer system is disclosed. The method is carried out by providing a computer core with a central processing unit connected to a display portion of the portable computer system by way of a first type interface and an operably independent video playback unit arranged to read video data stored in a video storage device connected to the display portion by way of a second type interface. In a video playback mode only, powering up the video playback unit and if the computer core is powered up, powering down the computer core. Reading the video data at a native format from the video storage device, sending the video data to the display portion by way of the second type interface, converting the video data from the native format to a display format, and displaying the video data. The video data storage device can many forms including digital versatile disk, or more commonly referred to as DVD.

The invention will now be described in terms of a representative portable computing system such as a laptop computer, notebook computer, and the like. Although described in terms of such portable computer platform, the reader is advised that any system capable of displaying video data derived from a storage medium, such as a DVD and the like, is well suited for the invention and should therefore not be construed as limiting either the scope or intent of the invention.

Figure 2:
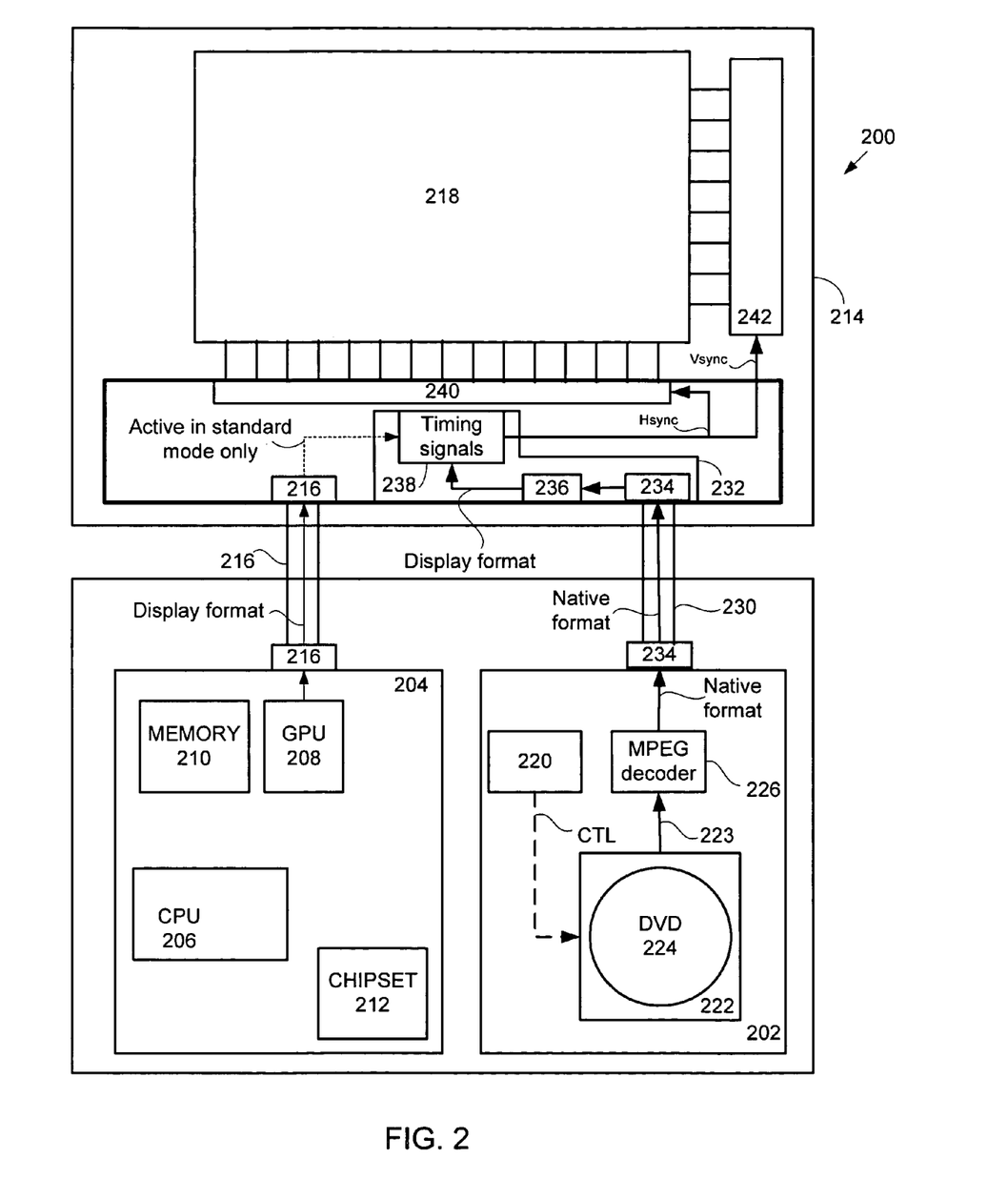
FIG. 2 shows a portable computer system (such as a notebook computer) in accordance with an embodiment of the invention.

Accordingly, FIG. 2 shows a portable computer system 200 (such as a notebook computer) in accordance with an embodiment of the invention. The computer system 200 includes a DVD player unit 202 that is powered up only during what is referred to as a DVD playback mode. The computer system 200 also includes a computer core 204 that is operably independent of the DVD player unit 202 having a CPU 206, a GPU 208, a memory 210, and a chipset 212 coupled to a display portion 214 having a display screen 218 by way of a first type interface 216. In the described embodiment, since the GPU 208 provides the necessary format conversion, the first type interface 216 must be able to support the highest possible display resolution of the display screen 218 (such as, for example, 1024×768 or 1280×1024) requiring data transmission rates on the order of 2 Gbps for the higher display resolution modes. At these data transmission rates, current low voltage differential signal (LVDS) type interfaces well known to those skilled in the art are used to connect the GPU 208 to the display screen 218 by way of an LVDS interface 216. It should be noted that low-voltage differential signaling (LVDS) is a signaling method used for high-speed transmission of binary data over copper.

In order to playback a DVD while the computer core 204 is operating, the computer 200 is placed in a DVD playback mode which requires that the computer core 204 be powered off (or, conversely, when the portable computer 200 is initially powered on in the DVD playback mode, the computer core 204 remains powered off thereby obviating the need to boot up the native operating system on which the CPU 206 operates). It should be noted that in some situations, the computer core can be placed in a low or even very low power mode instead of being powered off. In the described embodiment, the DVD playback unit 202 includes a DVD drive engine 220 that provides control signals CTL to a DVD reader 222. The DVD reader 222, in turn, provides MPEG video data read from a DVD 224 inserted therein to a hardware based MPEG decoder unit 226. It is contemplated that the MPEG decoder unit 226 can take any appropriate form such as a low cost integrated circuit or circuits such as the CISCO CDN MPEG 1 2 VIDEO-DECODER manufactured by Cisco Systems of Menlo Park, Calif. Since the MPEG decoder unit 226 is implemented in hardware (as opposed to conventional software based MPEG decoders used in prior art configurations that must be executed by the CPU), the computer core 204 can be bypassed during the DVD playback mode and be placed in a power down mode (or sleep mode) or powered off entirely. In this way, the overall power consumption of the portable computer 200 can be substantially reduced during the DVD playback mode as compared to conventionally configured portable computers with DVD playback capability. In addition, when the computer core 204 (and the CPU 206) is initially powered off, it is not necessary to boot up the computer 204 when the portable computer 200 is initially powered up in the DVD playback mode thereby providing an "instant on" feature unavailable in conventional DVD playback capable portable computers that require the use of the CPU for software based MPEG decoding.

Since, in the described embodiment, the image resolution provided by the MPEG decoder unit 226 is the native format of the video data encoded on the DVD 224 (which is typically standard definition interlaced (SDi) format (i.e., 480i/576i)) a lower bandwidth interconnect such as an ITU-656 compliant interface (or its equivalent) that operates at approximately 27 MHz can be used. It should be noted that 27 MHz is approximately equal to a pixel clock rate suitable for a VGA (i.e., 640×480) resolution image provided by the DVD 224. Therefore, the ITU-656 standard is well suited to provide the requisite connection by way of a data bus 230 between the MPEG decoder unit 226 and a timing/format controller unit (TFCON) 232. It should be noted that at these contemplated pixel rates, the use of low voltage differential signaling protocols (such as LVDS) is unnecessary in the DVD play back mode and therefore the use of the separate, lower capacity, data bus 230 takes advantage of this fact thereby functionally separating the computer core 204 and the DVD playback unit 202. Therefore, by providing hardware based MPEG decode capability and a dedicated video data bus, the inventive portable computer architecture provides a DVD playback mode with "instant on" capabilities without sacrificing battery life.

In the described embodiment, the TFCON 232 includes an ITU-656 compliant interface 234 arranged to receive the video data from the MPEG decoder unit 226 having 9 pins. Upon receiving the decoded stream from ITU-656 interface 234, a format converter unit 236 included in or coupled to the TFCON 232 converts the input resolution (such as standard definition interlaced (SDi) format i.e., 480i/576i) to a display resolution such as 1024×768 and 1280×1024. A timing/control signal generator 238 then provides the necessary timing and control signals to a column driver circuit 240 and row driver circuit 242 for display of the images on the display 218.

Figure 3:
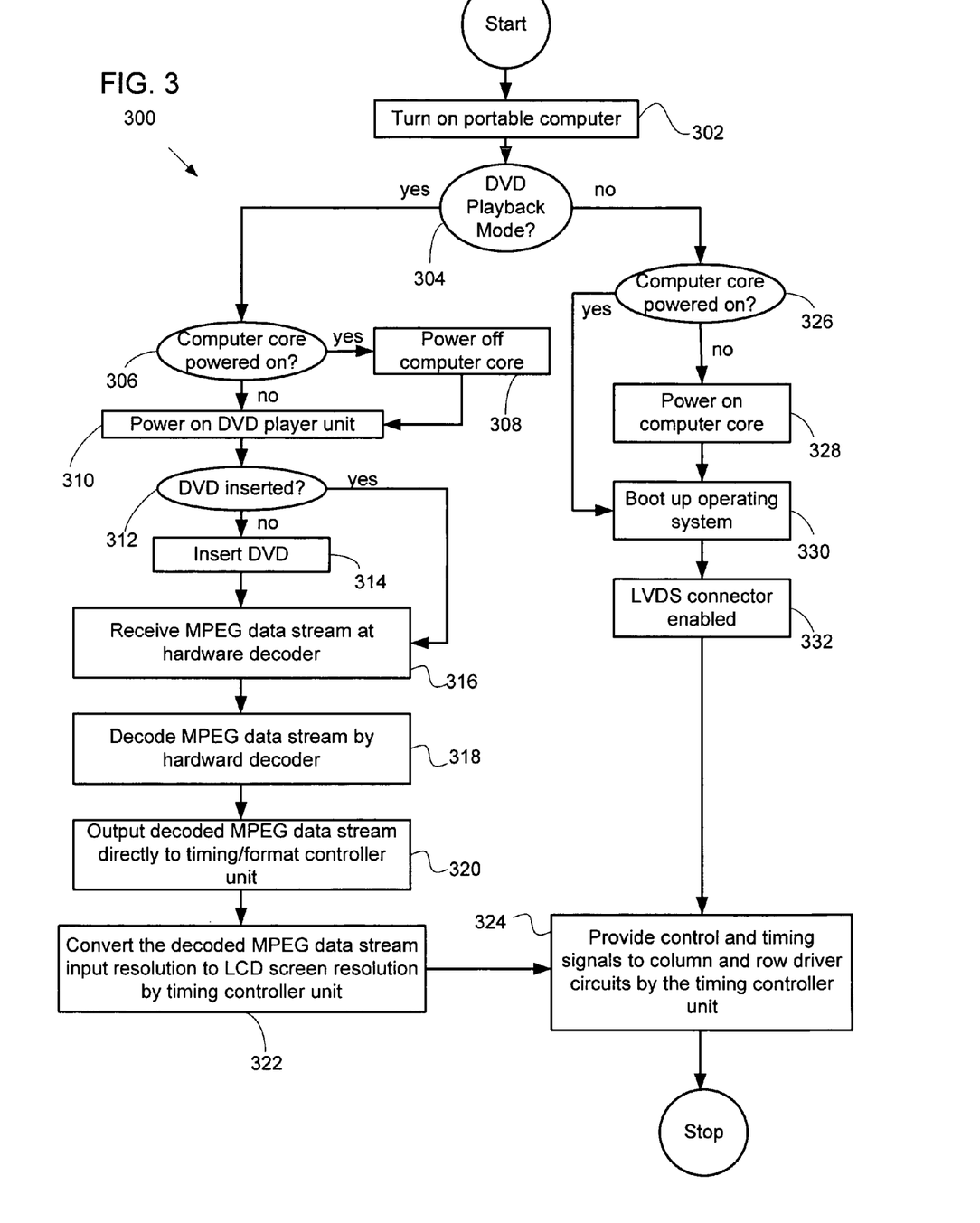
FIG. 3 shows a flowchart detailing a process for providing a low power, DVD playback in a portable computer system.

FIG. 3 shows a flowchart detailing a process 300 for providing a low power, DVD playback in a portable computer system. The process 300 begins at 302 by powering up the portable computer system. At 304, a determination is made whether the portable computer system is in a DVD playback mode. If it is determined that the portable computer system is in the DVD playback mode, then at 306 a determination is made if the computer core is powered on. If the computer core is powered on, then at 308 the computer core is powered off (or, optionally, in a low or very low power state) otherwise control is passed directly to 310 where a DVD player unit is activated. At 312, if a DVD is not detected in the DVD player unit, then a DVD is inserted at 314 and MPEG video data is read from the DVD at 316 by a hardware MPEG decoder unit which decodes the MPEG video data at 318. The decoded MPEG video data stream in native format is then passed directly to a timing/format controller unit included in a display portion of the portable computer by way of a video data bus at 320. Since the video data stream is a lower resolution than that required by the display, the lower bandwidth required can be met using an ITU-656 compliant interface, for example.

The timing/format controller unit then converts the input image resolution from that provided by the MPEG decoder unit to a image resolution appropriate for the display screen at 322. At 324, the timing controller unit then provides all necessary timing and control signals to column and row driver circuits well known to those skilled in the art at 324.

Returning to 304, if it is determined that the portable computer system is not in the DVD playback mode and it is determined that the computer core is not powered on at 326, then the computer core is powered on at 328 and the native operating system is booted up at 330. At 332, image data at the display resolution is sent by the computer core a timing signal generator unit coupled to the display screen by way of a high speed, high data rate interface (such as LVDS). In some embodiments, the image data is processed by way of a graphical processor unit prior to transmission to the display screen, but in any case, the high speed video data bus must be used in order to accommodate the highest possible display resolution of the portable computer system.

Figure 4:
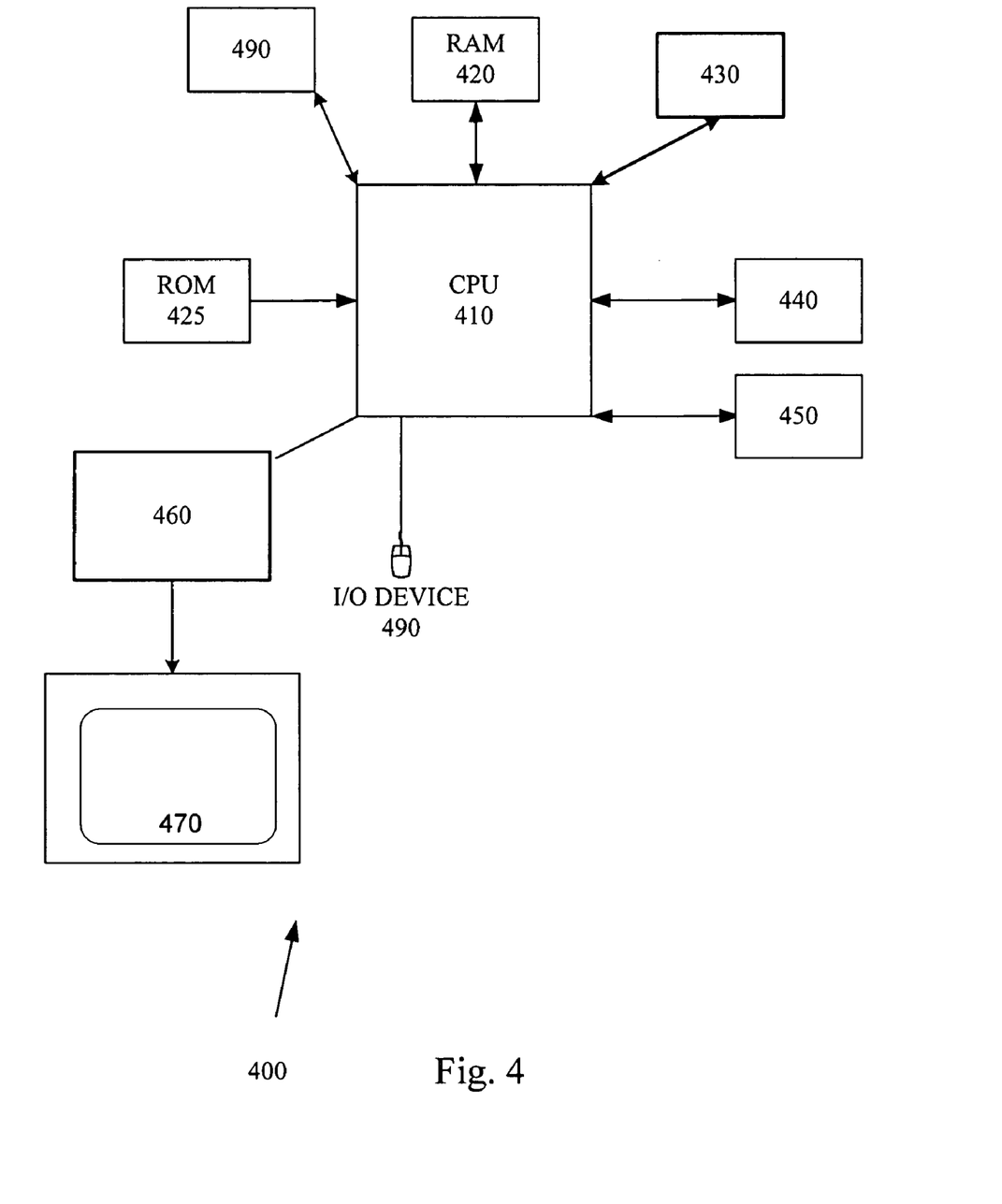
FIG. 4 illustrates a system employed to implement the invention.

FIG. 4 illustrates a system 400 employed to implement the invention. Computer system 400 is only an example of a graphics system in which the present invention can be implemented. System 400 includes central processing unit (CPU) 410, random access memory (RAM) 420, read only memory (ROM) 425, one or more peripherals 430, graphics controller 460, primary storage devices 440 and 450, and digital display unit 470. CPUs 410 are also coupled to one or more input/output devices 490 that may include, but are not limited to, devices such as, track balls, mice, keyboards, microphones, touch-sensitive displays, transducer card readers, magnetic or paper tape readers, tablets, styluses, voice or handwriting recognizers, or other well-known input devices such as, of course, other computers. Graphics controller 460 generates analog image data and a corresponding reference signal, and provides both to digital display unit 470. The analog image data can be generated, for example, based on pixel data received from CPU 410 or from an external encode (not shown). In one embodiment, the analog image data is provided in RGB format and the reference signal includes the $V_{SYNC}$ and $H_{SYNC}$ signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. In a portable computer system of the type that includes a computer core with a central processing unit connected to a display portion of the portable computer system by way of a first type interface and an operably independent video playback unit integrated into the computer system and arranged to read video data stored in a video storage device connected to the display portion by way of a second type interface, a low power method of displaying video from a video storage device, comprising:
   determining if the portable computer system is operating in a video playback mode only, and if so:
   powering on the video playback unit;
   determining if the computer core is powered on, and if so, powering off the computer core;
   reading the video data at a native format from the video storage device;
   sending the video data to the display portion by way of the second type interface;
   converting the video data from the native format to a display format; and
   displaying the video data on the display.

2. A method as recited in claim 1, wherein the video storage device is a DVD.

3. A method as recited in claim 2, wherein the video playback unit includes a hardware implemented MPEG decoder and a DVD reader unit arranged to read MPEG data from the DVD coupled to the MPEG decoder.

4. A method as recited in claim 3, wherein the display portion includes a format converter unit coupled by way of the second type interface to the MPEG decoder.

5. A method as recited in claim 4, wherein the reading comprises: reading the MPEG data by the DVD reader unit;
   passing the MPEG data to the MPEG decoder;
   decoding the MPEG data to form video data having a native format;
   passing the native format video data to the format converter by way of the second type interface;
   formatting the native format video data to form displayable format video data suitable for display on a display incorporated into the display portion; and
   displaying the video data on the display.

6. A method as recited in claim 1, wherein the first type interface is an LVDS type interface and wherein the second type interface is an ITU-656 compliant type interface.

7. A battery powered computing device, comprising:
   a core including a processor;
   a playback device integrated into the computing device;
   a display screen that is configured to display images from the processor or from the playback device, wherein the computing device is configured to operate in a video playback mode whereby video images from the playback device are displayed on the display screen while the processor of the core is powered down wherein the processor is programmed to determine if the battery powered computer device is operating in a video playback only mode, and if so, to power down the core if the core is powered on.

8. The device of claim 7, wherein the playback device includes an MPEG decoding device that decodes encoded video images.

9. The device of claim 7, wherein the core is connected to the display screen via a first interface that is active when the computing device is not operating in the video playback mode.

10. The device of claim 9, wherein the playback device is connected to the display screen via a second interface.

11. The device of claim 10, wherein the second interface has a slower data rate than the first interface.

12. The device of claim 7, wherein the playback device is a DVD player.

13. A computer readable media including instructions stored thereon that are executable by a processor in a core of a computing device of the type that includes a playback device integrated into the computing device and a display screen that is configured to display video images from the processor or from the playback device, wherein the instructions, when executed, cause the processor to:
   determine if the computing device is operating in a video playback mode whereby video images from the playback device are displayed on the display screen; and
   power down the processor if the computing device is operating in the video playback mode.

14. A battery powered computing device, comprising:
   a core including a processor;
   a playback device integrated into the computing device;
   a display screen that is configured to display video images from the processor or from the playback device, wherein the computing device is configured to operate in a video playback mode whereby video images from the playback device are displayed on the display screen; and
   means for determining if the computing device is operating in the video playback mode and if so, for powering down the processor such that the playback device provides the video images to the display screen while the processor is powered down.

* * * * *

UNITED STATES PATENT AND TRADEMARK OFFICE
CERTIFICATE OF CORRECTION

PATENT NO. : 7,643,731 B2  Page 1 of 1
APPLICATION NO. : 10/903656
DATED : January 5, 2010
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1528 days.

Signed and Sealed this

Sixteenth Day of November, 2010

David J. Kappos
*Director of the United States Patent and Trademark Office*